J. G. UTZ.
BEARING.
APPLICATION FILED APR. 21, 1919.
1,339,991.
Patented May 11, 1920.
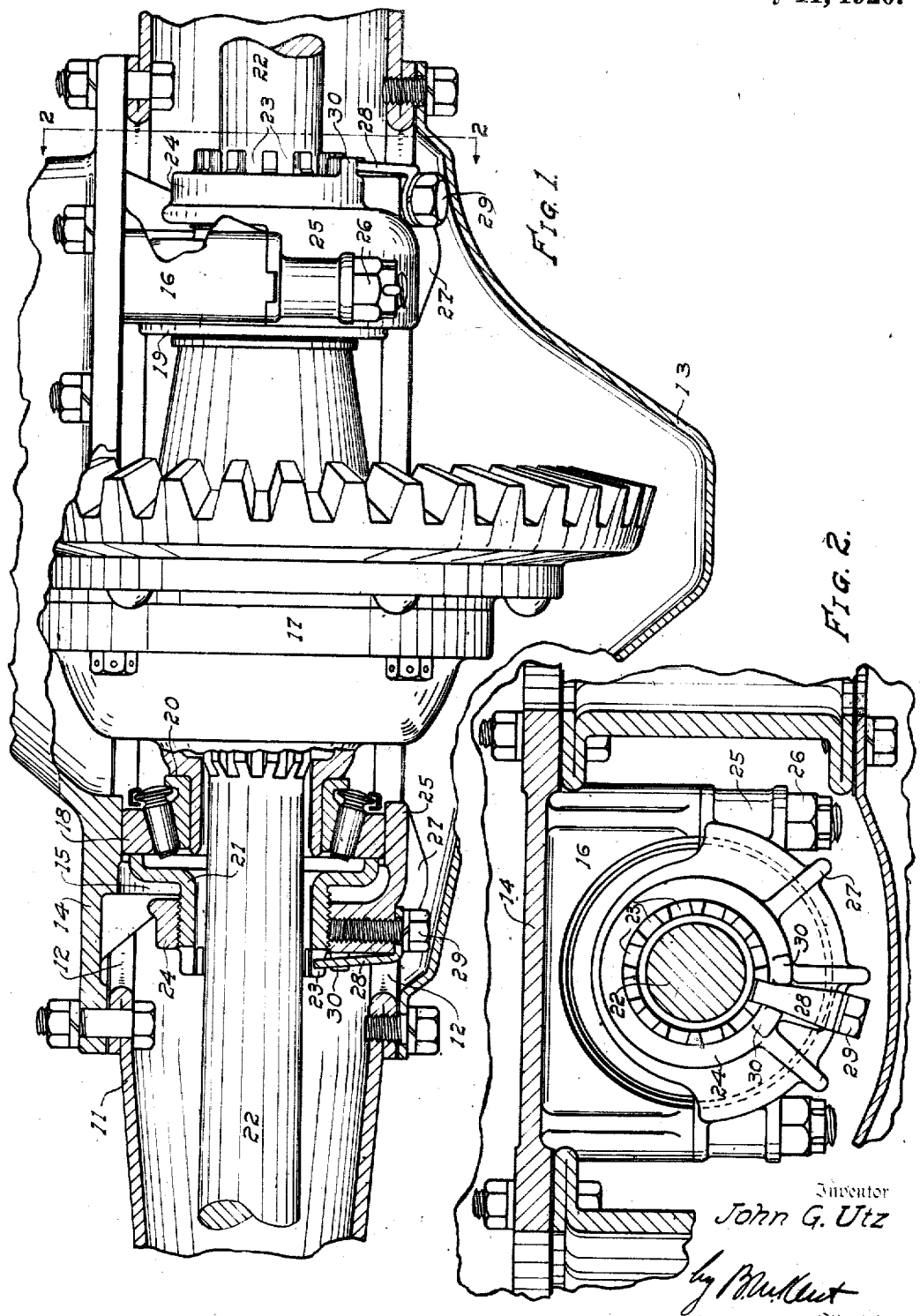
Inventor
John G. Utz

UNITED STATES PATENT OFFICE.

JOHN G. UTZ, OF CLEVELAND, OHIO, ASSIGNOR TO THE STANDARD PARTS COMPANY, OF CLEVELAND, OHIO, A CORPORATION OF OHIO.

BEARING.

1,339,991.  Specification of Letters Patent.  Patented May 11, 1920.

Application filed April 21, 1919. Serial No. 291,674.

*To all whom it may concern:*

Be it known that I, JOHN G. UTZ, a citizen of the United States, and a resident of Cleveland, county of Cuyahoga, State of Ohio, have invented certain new and useful Improvements in Bearings, of which the following is a specification.

This invention relates to bearings and more particularly to an adjusting device for the bearings of motor vehicle axles.

It is one of the objects of the invention to provide a one-piece support through which a member may be adjusted to hold the bearing of a differential gearing in proper position.

Other objects and the features of novelty will be apparent from the following description, taken in connection with the accompanying drawings, of which:—

Figure 1 is a horizontal section through a motor vehicle axle on the axis of the differential gearing and showing a structure embodying my invention, certain parts being shown in elevation; and Fig. 2 is a fragmentary cross section on the line 2—2 of Fig. 1.

In the drawings, 11 indicates the axle housing, which, in the form illustrated, has openings 12 in the sides thereof, the one opening being closed by the case cover 13, and the other by the cover plate 14, which is extended outwardly to provide a support for the driving mechanism, not shown. The cover plate 14 is formed with inwardly extending brackets 15 and 16 in which the differential gearing 17 is rotatably mounted by means of bearings 18 and 19. The differential gearing 17 may be of any preferred design and the description thereof is omitted, because it forms no part of the invention, and inasmuch as the structure of the brackets 15 and 16 and their coöperating parts are identical, but one will be described.

As shown at the left in Fig. 1, the differential gearing has a part thereof rotatably supported in the bearing 18, and is formed with a shoulder 20 against which the bearing engages to hold the differential gearing in position. The opposite side of the bearing 18 is engaged by an adjusting ring 21, which surrounds the driving shaft 22 and is provided around its free edge with notches 23 in which a tool may be engaged, in order to adjust the ring relatively to the shoulder 20. A fixed ring 24 is formed integral with a cap 25 which is removably secured by nuts 26 to its bracket 15 or 16, to furnish with the bracket a seat for the bearing 18 and the cap and the fixed ring are provided with ribs 27 to furnish a light but rigid structure. The interior of the fixed ring 24 is threaded to engage the threads on the adjusting ring 21 and a holding clip 28 is held on the fixed ring by screw 29 and is adapted to pass between the lugs 30 on the fixed ring and enter one of the notches 23 in the adjusting ring to hold the latter in its adjusted position. By providing the adjusting ring 21 with a support of this kind, which is in one piece and is rigidly connected to the housing, the difficulties of forming a thread in a two-piece support are avoided, and an adjusting structure is obtained by which the bearing 18 will be firmly held in proper position and adjustment. It will also be noted that, since a slight clearance is provided between the interior of the adjusting ring 21 and the shaft 22 and also between the exterior of the adjusting ring and the interior of the bearing seat, it is not necessary that the opening in the fixed ring 24 be centered accurately with the bearing seat, so that exact concentricity in machining is unnecessary in the manufacture of the parts.

While I have illustrated and described what I consider to be a preferred embodiment of my invention, it is understood that changes may be made in the details of construction, without departing from the spirit of the invention which is defined in the appended claims.

Having thus described my invention, what I claim is:

1. In mechanism of the class described, the combination of a member having a bearing seat, a cap secured to said member, a bearing in said bearing seat, a threaded ring carried by said cap, and an adjusting member coöperating with the threaded ring to hold the bearing in position axially.

2. In mechanism of the class described the combination of a supporting member, a cap removably secured thereto, said member and cap having a bearing seat formed therein, a bearing within said bearing seat, a threaded ring carried by said cap, and a similarly threaded member coöperating with said threaded ring to adjust said bearing.

3. In mechanism of the class described, the combination of a supporting member, a cap removably secured to said member and comprising a one-piece ring integral with said cap, a bearing seated in said member and said cap, and a member for adjusting said bearing coöperating with said one-piece ring.

4. In mechanism of the class described, the combination of a supporting member, a cap removably secured thereto and comprising a threaded ring integral with said cap, a bearing seated in said member and said cap, means for adjusting said bearing comprising a threaded adjusting member coöperating with the ring carried by the cap, and means for holding said adjusting member in adjusted position.

5. In mechanism of the class described, the combination of a supporting member, a cap removably secured thereto, the said member and cap having a bearing seat formed therein, a bearing in said seat, and means for adjusting said bearing comprising a ring carried by said cap and having a threaded opening therein in substantial alinement with said bearing seat, a threaded member adjustable in said threaded ring, and means for holding said threaded member in adjusted position.

In testimony whereof I affix my signature.

JOHN G. UTZ.